June 12, 1945.　　　　L. T. FINIZIE　　　　2,377,873
APPARATUS FOR COOKING FOODS
Filed May 31, 1941　　　　6 Sheets-Sheet 2

INVENTOR.
LYONEL T. FINIZIE
BY Conrad A. Dieterich
his ATTORNEY

June 12, 1945.　　　　L. T. FINIZIE　　　　2,377,873
APPARATUS FOR COOKING FOODS
Filed May 31, 1941　　　6 Sheets-Sheet 3

Fig. 3.

INVENTOR.
LYONEL T. FINIZIE
BY Conrad A. Dietrich
his ATTORNEY

June 12, 1945.  L. T. FINIZIE  2,377,873
APPARATUS FOR COOKING FOODS
Filed May 31, 1941  6 Sheets-Sheet 4

INVENTOR.
LYONEL T. FINIZIE
BY
his ATTORNEY

June 12, 1945.  L. T. FINIZIE  2,377,873
APPARATUS FOR COOKING FOODS
Filed May 31, 1941  6 Sheets-Sheet 5

INVENTOR.
LYONEL T. FINIZIE
BY Conrad A. Dieterich
his ATTORNEY

June 12, 1945.    L. T. FINIZIE    2,377,873
APPARATUS FOR COOKING FOODS
Filed May 31, 1941    6 Sheets-Sheet 6

INVENTOR.
LYONEL T. FINIZIE
BY Conrad A. Dietrich
his ATTORNEY.

Patented June 12, 1945

2,377,873

UNITED STATES PATENT OFFICE 2,377,873

APPARATUS FOR COOKING FOOD

Lyonel T. Finizie, Bridgeport, Conn.

Application May 31, 1941, Serial No. 396,045

14 Claims. (Cl. 219—35)

My invention relates to improvements in heating apparatus and the same has for its object to provide a simple, efficient and reliable apparatus for cooking, roasting, broiling or otherwise treating different articles of food.

Further, said invention has for its object to provide an apparatus in the form of a closed receptacle in which the food is exposed to radiant heat in the presence of an aqueous vapor during the cooking, broiling or other operation.

Furthermore, said invention has for its object to provide an apparatus in which the food to be cooked is enclosed in a receptacle in the presence of radiant heat and aqueous vapor, and the receptacle enclosed in an outer receptacle to provide an air space between said receptacles.

Further, said invention has for its object to provide an apparatus including a receptacle having heating means therein, and a member for receiving and supporting the food to be treated movable into and from operative positions relative to said receptacle.

Further, said invention has for its object to provide an apparatus including a double-walled chamber or receptacle enclosing the heating medium, and a member serving as a bottom member for said recptacle having means thereon for movably supporting the articles of food to be heated, and means for moving said bottom member into and from operative relation to said chamber or receptacle and actuating the food supporting means.

Further, said invention has for its object to provide an apparatus in which the heating means is automatically rendered operative when the bottom member with the food therein is moved into position to close the heating chamber or receptacle, and to automatically discontinue the operation of said heating means when the bottom member is actuated to permit of the removal of the articles of food after the same have been cooked or otherwise treated.

Further, said invention has for its object to provide means for automatically controlling the heating and motor circuits of the apparatus.

Other objects will in part be obvious, and in part be pointed out hereinafter.

To the attainment of the aforesaid objects and ends my invention consists in the novel features of construction, and in the combination, connection and arrangement of parts hereinafter more fully described, and then pointed out in the claims.

In the accompanying drawings.

Figure 1:
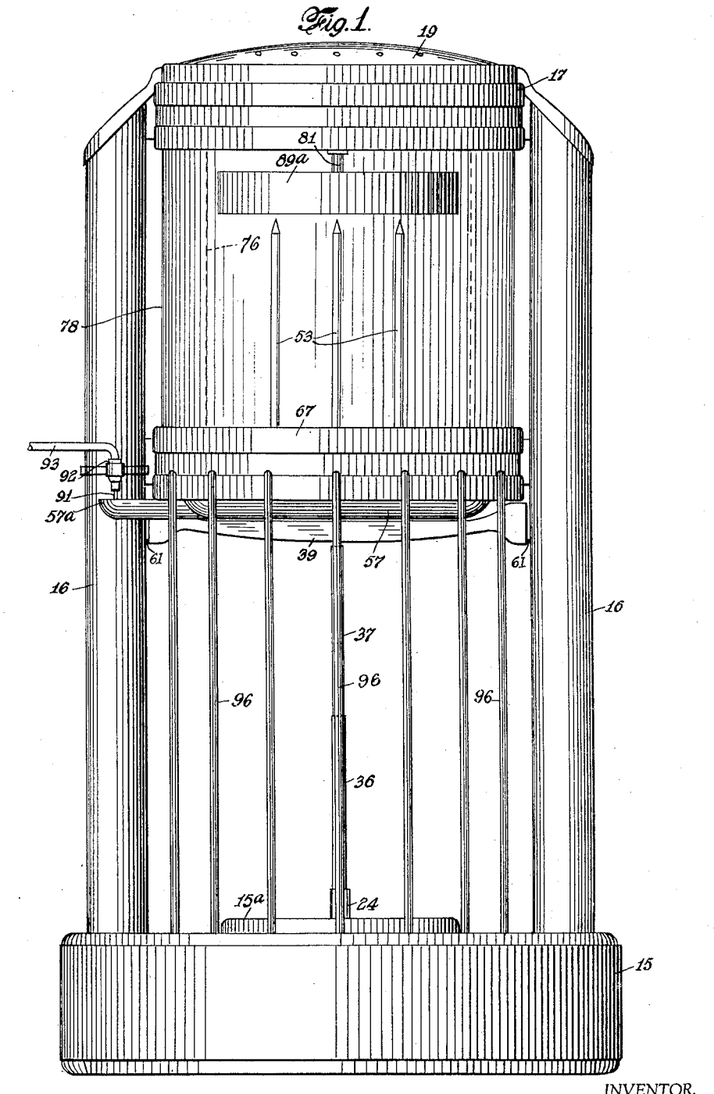
Figure 1 is a front elevation illustrating one form of cooking apparatus constructed according to and embodying my said invention.
Figure 2:
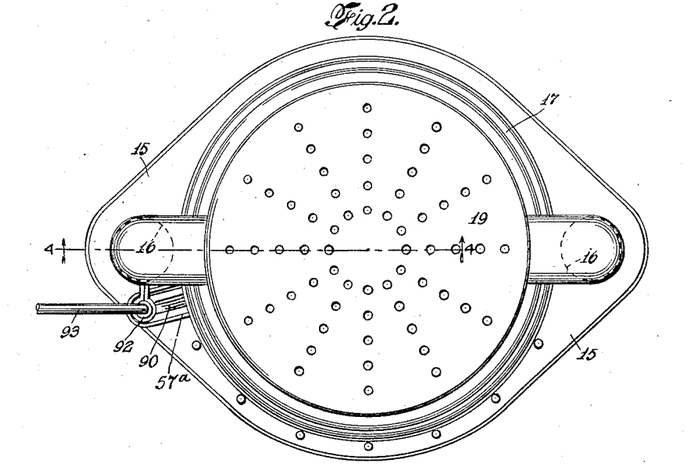
Fig. 2 is a top or plan view thereof.
Figure 3:
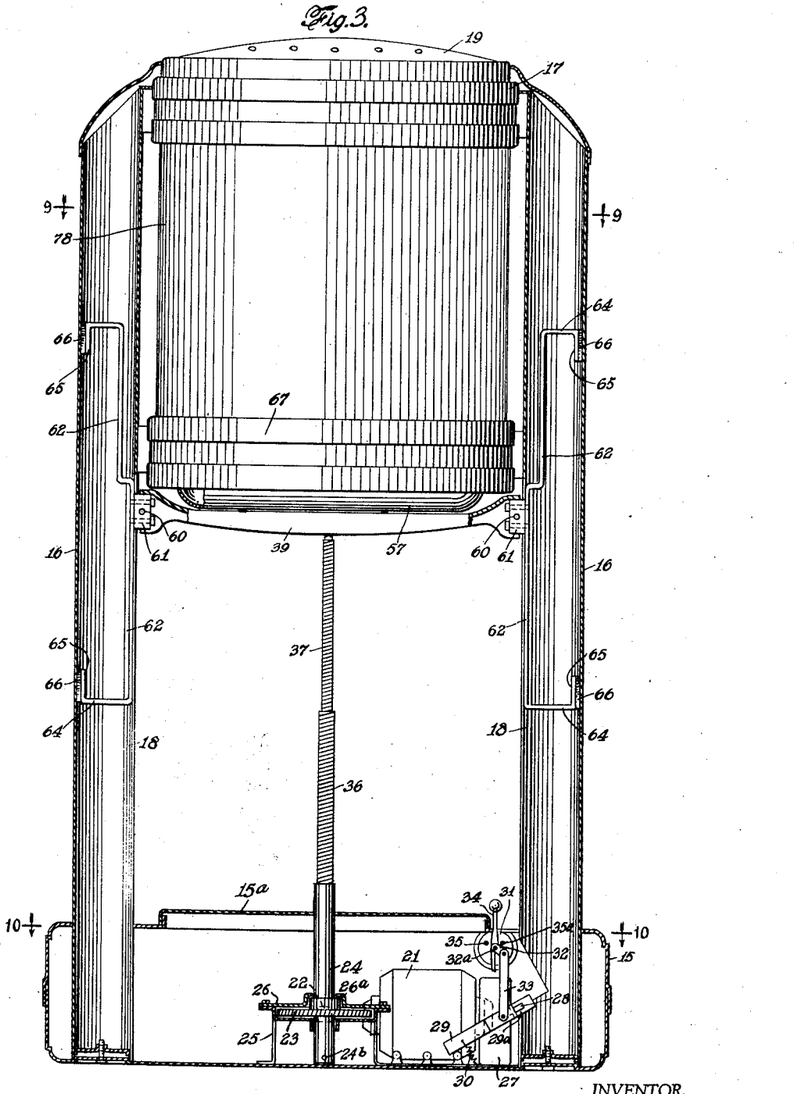
Fig. 3 is a front elevation, partly broken away and in section.
Figure 4:
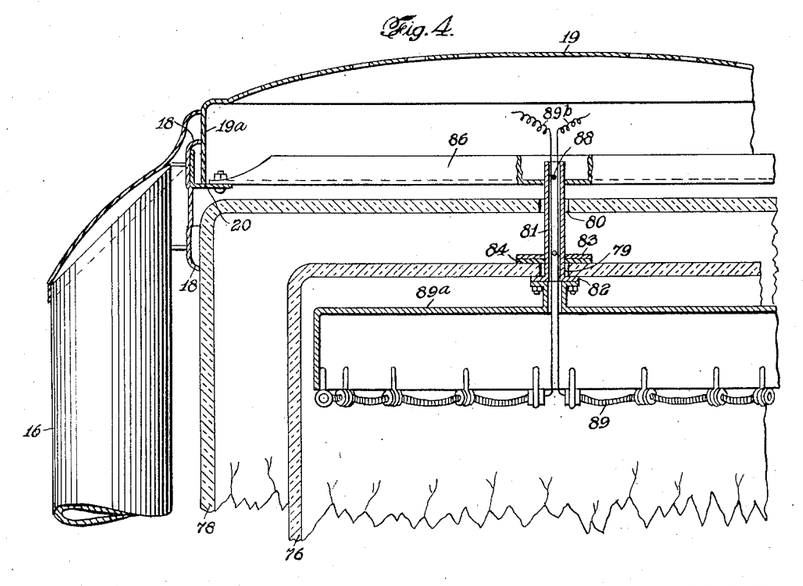
Fig. 4 is an enlarged detail section on the line 4—4 of Fig. 2.
Figure 5:
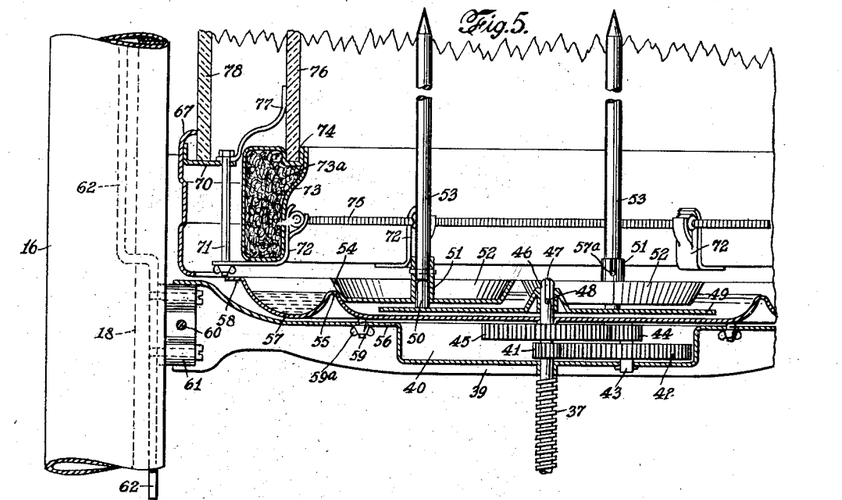
Fig. 5 is an enlarged detail section on the line 5—5 of Fig. 9.
Figures 6, 7, 8:
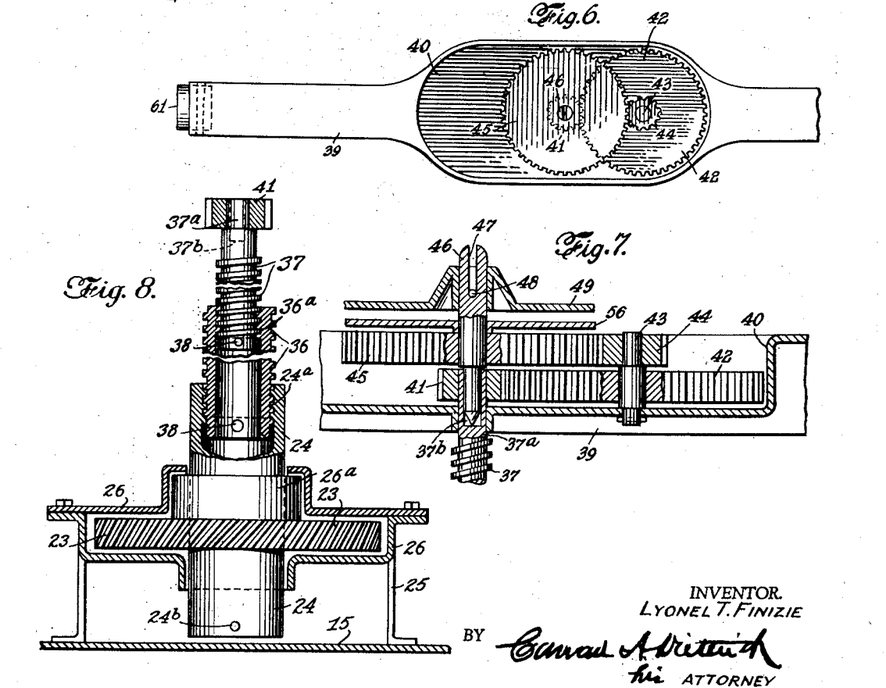
Fig. 6 is an enlarged detail plan view of the transverse support and gear housing.
Fig. 7 is an enlarged detail side view, partly broken away and in section, showing the gearing and associated parts seen in plan at Fig. 6.
Fig. 8 is an enlarged detail section, partly broken away, of the operating shaft.
Figure 9:
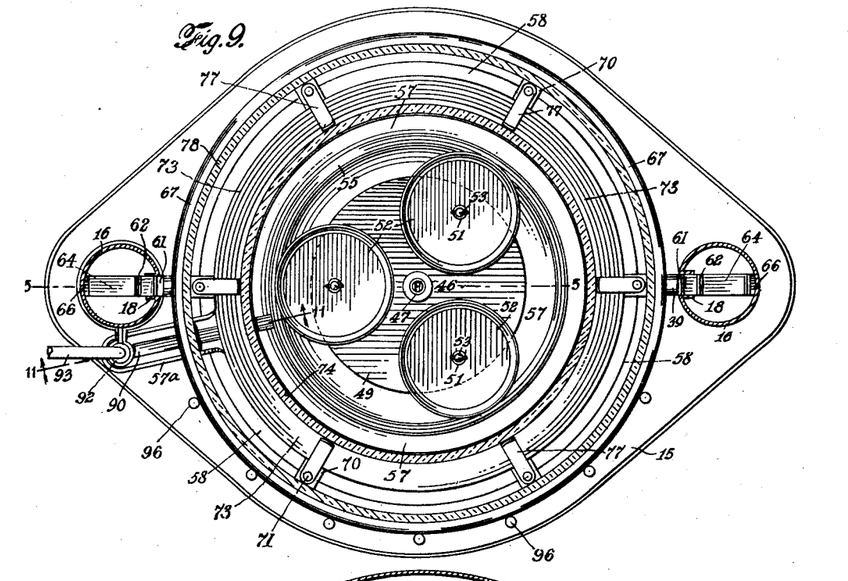
Fig. 9 is a transverse section on the line 9—9 of Fig. 3.
Figure 10:
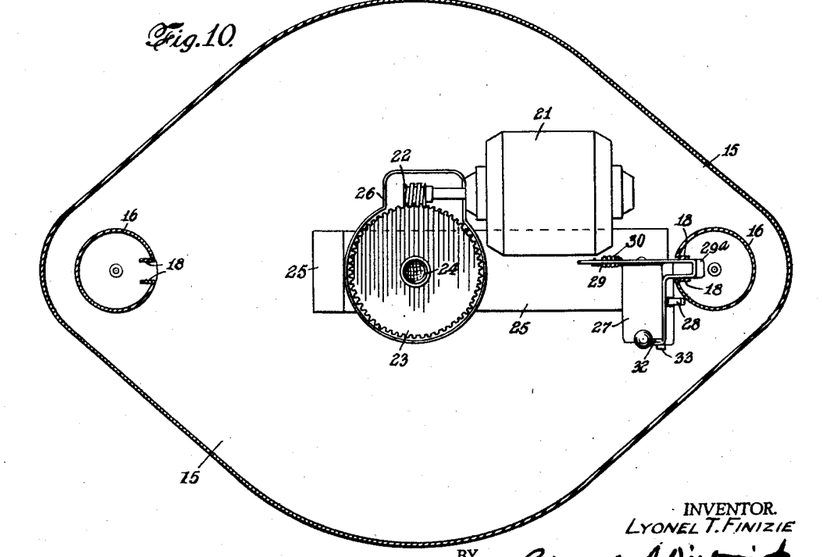
Fig. 10 is a transverse section on the line 10—10 of Fig. 3.
Figure 11:
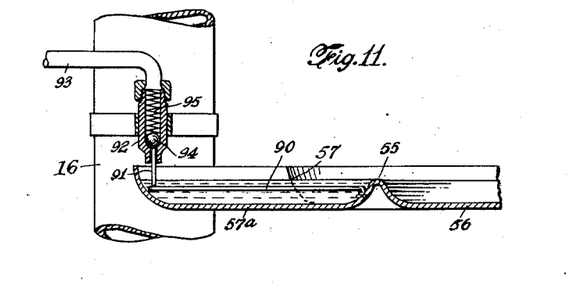
Fig. 11 is a detail section on the line 11—11 of Fig. 9, showing the thermostatic control.
Figure 12:
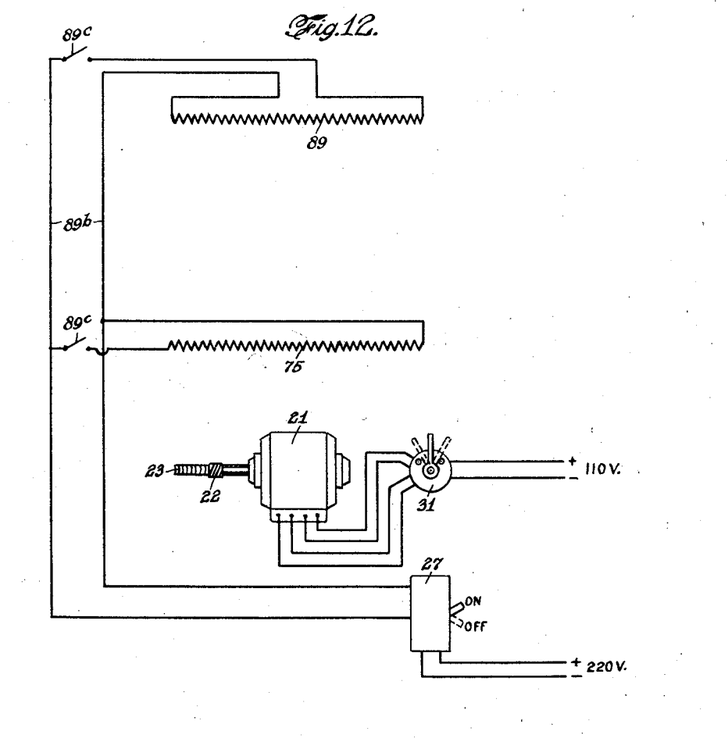
Fig. 12 is a diagram showing the wiring of the apparatus.

In said drawings, the apparatus is shown comprising a hollow base 15 of approximately elliptical form having an opening in its top provided with a removable cover 15$^a$. 16 denote tubular posts or standards secured at their lower ends to the opposite ends of said base, and to the upper ends of said posts or standards is secured an annular member 17 having short inturned flanges 17$^a$ at its upper and lower edges. A perforated or open-work cover 19 having a depending peripheral flange 19$^a$ is fitted into the open upper portion of said annular member 19 and supported upon brackets 20 secured at intervals to the inner side of said annular member 17. The tubular posts or standards 16 are split longitudinally at their inner sides and the edges thereof turned inwardly to form vertical guides 18.

Within the hollow base 15 is arranged an electric motor 21 having a worm 22 fixed upon one end of its armature shaft meshing with a worm gear 23 fixed upon the lower end of a hollow vertical main or operating shaft section 24 whose lower end extends through a covered gear case or housing 26 mounted upon legs 26$^a$ secured to the base 15. The worm gear 23 is provided with a hub 23$^a$ having a lock screw 23$^b$ for securing said gear 23 to the shaft section 24. The lower end of the shaft section 24 is provided with a pin 24$^b$ which traverses said shaft section, and serves as a stop to limit the downward movement f the shaft section 36 when the same is retracted or fully telescoped within said shaft section 24.

27 denotes a switch arranged upon the base 15 adjacent the motor 21 for controlling the supply of current to the apparatus. The switch 27 has an operating arm 28 engaged by an irregularly shaped lever 29 having its forward end pivotally secured to the switch 27, and its rear end pivotally secured to the opposite side of said switch. The rear end of the lever 29 has secured to it one end of a spring 30 whose other end is secured to the switch 27 to maintain the transverse portion 29a of the lever 29, which embraces the switch arms 28, normally raised, to supply current to the heating elements of the apparatus.

31 denotes a double action switch having an operating arm 32 secured to a shaft 32a and connected by a link 33 with the forward end of the lever 29, and a weighted arm 34 also secured to the shaft 32a, and its free end adapted to engage with the link 33, when the lever 29 is actuated, and shift the upper end of the arm 34 into neutral position intermediate the studs 35, 35a.

The shaft section 24 is provided upon its inner side adjacent its upper end with a short screw-threaded portion 24a in which works an externally-threaded hollow shaft section 36. The shaft 36 is also provided upon its inner side adjacent its upper end with a short, screw-threaded portion 36a in which works the externally screw-threaded solid shaft portion 37 having a reduced upper end 37a provided with a socket 37b therein. The shaft sections 36 and 37 are provided at their inner ends with pins or studs 38 to serve as stops to prevent the lower ends of said shaft sections becoming disengaged from the upper ends of their cooperating members.

The reduced upper end 37a of the shaft section 37 extends from below through the U-shape transverse support 39 having an enlarged depressed intermediate portion 40 serving as a gear case in which are disposed a pinion 41 fixed upon the upper end of the shaft section 37. The pinion 41 meshes with a large gear 42 fixed on a shaft 43 upon which is also fixed a pinion 44 meshing with a large gear 45 fixed upon a short shaft 46 having its lower end reduced and supported in the recess 37b of the operating shaft section 37. The upper end of the short shaft 46 is rounded and provided with a transverse slot 47. Upon the upper end of the shaft 46 is disposed a flat circular support 49 having a circular opening therein to receive the shaft 46, and a pin 48 adapted to engage with the transverse slot 47 in said shaft 46 to hold said circular support 49 keyed to said shaft. The support 49 is provided adjacent to its periphery, for example with three upwardly extending studs or short shafts 50 to receive the sockets 51 of the pans 52. Within the sockets 51 are secured by pins 51a the lower ends of spits 53. The pans 52 and attached spits 53 are freely rotatable upon the shaft 50, and are caused to rotate by the frictional engagement of the inclined flanges 54 thereof with the raised circular portion or rib 55 of the tray 56. The tray 56 is provided with an annular water trough 57 from which extends a flat rim 58. The tray 56 is held in stationary position upon the support 39 by bolts 59, extending from below through the upper wall of the transverse movable support 39. The projecting ends of the bolts 59 are provided with wing nuts 59a.

The ends of the transverse support 39 are secured by bolts 60 to blocks 61 which, in turn, are secured to guides 62 by screws 63. The guides 62 consist of relatively narrow flat members having rearwardly directed upper and lower portions 64 terminating in vertical ends 65 to which are secured fibre pads or washers 66 engaging the inner surfaces of the tubular standards or posts 16. The forward off-set portions 62a work between the inturned edges or guides 18 of said standards 16.

67 denotes an annular intermediate member which corresponds in shape with the annular member 17, and is secured at points below said top member 17 to the inner sides of the standards 16 by brackets 68. Upon the inner side of the annular member 67, adjacent its upper edge are secured brackets 70 through which extends bolts 71 having their lower ends extending through and supporting the brackets 72 in which is supported a hollow annular member 73 having a recess 74 in its upper edge. The interior of the annular member 73 contains a heat insulating filling 73a of glass wool or other suitable material, and upon the inner sides of the brackets 72 is secured a circular resistance element 75 serving as a heating element.

76 denotes a glass dome which serves as a cooking or roasting chamber, having the lower edges of its side wall portions disposed within the recess 74 at the annular member 73, and held in place partly by springs 77 having their lower ends secured to the brackets 70 by the bolts 71 and their free upper ends bearing against the outer side of the side wall of said glass dome 76.

78 denotes a second or outer glass dome which is of larger diameter than the dome 76 which it encloses. The lower edge of the outer dome 78 is supported upon the brackets 70 extending from the inner side of the annular member 17. Both the inner dome 76 and the outer dome 78 are provided at their tops with registering apertures 79, 80, respectively, to receive a tubular securing member 81 having a flange 82 at its lower end upon which the top of the inner dome 76 rests, and a washer 83 and packing 84 disposed above the top of the inner dome 76, to form a tight closure. The upper end of the securing member 81 extends freely through the aperture 80 in the top of the outer dome 78, and into a U-shape cross-bar 86 secured at its ends to the brackets 20 at the inner upper edge of the upper annular member 17. A pin 88 extends through the tubular securing member 81, and rests upon the inner surface of the cross-bar 86 maintaining the domes 76 and 78 duly in position.

A second resistance element or heating device 89 is disposed within the inner dome 76 adjacent its upper end upon a reflecting hanger 89a secured to the flanges 82 of the tubular securing member 81. The said heating elements 75, 89 are connected in parallel in a circuit 89b which includes the switch 27. Switches 89c are provided in the heating circuit 89b to permit either of said heating elements 75, 89, to be rendered inoperative when desired.

The tray 56 is provided at one side with an extension 57a to receive a thermostatic-element 90 having one end secured to said tray 56, and its free end immersed in the water contained in the annular trough 57 and extension 57a. The end of said thermostatic element is engageable with the stem 91 of a valve 92 of the pipe 93 communicating with a source of water supply. The valve 92 is maintained normally closed by a ball 94 and spring 95, and is adapted to be opened when the water level in the annular trough 57 and extension 57ª is lowered and exposes the thermostatic element 90 and causes its free end to rise, due to heat within the apparatus, and lift the stem 91 and open the valve 92 to permit water to enter the annular trough 57, in order to restore the water level thereof to the required height.

96 denote a series of vertical bars having their lower ends socketed in the base 15 and their upper ends secured to the intermediate annular member 67. The said bars 86 form a grill or guard at the forward side of the apparatus while the rear side is left open for the introduction and removal of the articles of food when the tray 56 is lowered.

The operation of the apparatus will be more or less obvious from the foregoing description, and it will only be necessary to note that when an article of food is to be cooked or treated, the transverse support 39, tray 56 and support 49 carrying the spits 53 are first lowered by actuating the switch 31 to reverse the flow of current to the motor 21. Thereupon the said parts will be caused to descend by the rotation of the shaft part 24, and the telescoping of the shaft parts 36 and 37 and associated gearing. When the transverse support 39 reaches its lowermost position the guide 62 in the right hand standard 16 will engage the lever arm 29 and depress the same and at the same time correspondingly move the switch arm 28 of the switch 27 and break the circuit 28ᵇ including the heating elements 75 and 89. Simultaneously herewith the switch 31 connected by the arm 32 and link 33 with the lever 29 of the switch 27 will be actuated and the motor circuit will be broken and the operation of the motor 21 discontinued. The articles of food are then placed upon the spits 53 and the arm 34 of the switch 31 manually moved in a clockwise direction until it engages the right hand stud 35ª of the switch 31 thereby causing the lever 29 to open the switch 27 and energize the heating circuit 89ᵇ, and the switch 31 to energize the motor 21 and cause the worm 22 and worm gear 23 to rotate the shaft sections 24, 36 and 37 thereby causing the same to raise the transverse support 39 and at the same time rotate the support 49 through the gear train 41, 42, 44, 45 and cause the spits 53 to be rotated by the frictional engagement of the flanges 54 of the pans 52 with the annular rib of the tray 56. The shaft part 24 rotates continuously as the parts 36 and 37 become extended successively without rotation until the end of their respective vertical movement is reached, whereupon, due to the weight of the transverse support 39 and parts carried thereby, and the frictional engagement of the gears 41, 42, 44 and 45, said shaft parts will be held sufficiently against rotation until the support 39 reaches its uppermost position when further extension of said shaft parts 36, 37 will be arrested, and thereafter all of the shaft parts 24, 36, 37 will rotate as a unit and cause the gears 41, 42, 44 and 45 and the support 49 to rotate, and the latter to impart rotation to the spits 53.

When the transverse support 39 and its associated parts is caused to rise by the actuation of the double-acting switch 31 the end of the lever 29 of the switch 27 will be free, and the spring 30 will return the switch to circuit-closing position and thereby again energize the heating elements 75, 89. The above described operation is then continued until the food has been fully cooked, whereupon the switch 31 is again actuated and the arm 34 moved into engagement with the stud 35 and reverse the operation of the motor and cause the support 39 and parts carried thereby to descend. The cooked articles of food may then be removed, and the apparatus charged anew.

During the cooking or roasting operation water in the annular trough 57 of the tray 56 will evaporate and the evaporation plus the vapor arising from the food articles undergoing treatment will be carried away from the cooking receptacle or chamber 76 through the tubular securing member 81 at the upper end thereof.

When the level of the water in the trough falls sufficiently to expose and permit the thermostatic element 90 to become somewhat heated its free end will rise and engage the valve stem 91 of the water supply valve 92 and open the same to allow water to enter the trough 57 and again flood and cool said thermostatic element whereupon the free end thereof will be released from its engagement with the end of the valve stem 91 and the spring 95 again caused to close said valve 92 and discontinue the further supply of water to the trough 57.

Having thus described my invention what I claim and desire to secure by Letters Patent is:

1. An apparatus of the character described, comprising a cooking receptacle, means for supporting said receptacle, a base separate from said receptacle for closing the same, heating means for said receptacle, means for supporting said base, means for moving the same to and from closing position, food-supporting members operatively associated with said base, and means, co-operating with the means for moving said base, for rotating said food-supporting members by the engagement thereof with said base.

2. An apparatus of the character described, comprising a cooking receptacle, means for supporting the same, heating means for said receptacle, a separable base serving to close said receptacle, means for moving said base to and from closing position, a rotatable support disposed on said base and connected to said means for moving said base, food-supporting members revolubly mounted on said rotatable support, and friction means on said food-supporting members in engagement with said base; said means for moving said base to and from closing positions including co-operating means serving to operate said rotatable support and to cause said food-supporting members to rotate by the engagement of the friction means thereon with said base.

3. An apparatus of the character described comprising a cooking receptacle, means for supporting the same in elevated position, heating means within said receptacle, a movable support guided by said supporting means, a base on said movable support, a main shaft, means for rotating said shaft, a rotatable support fixed upon said shaft, food-supporting members on said rotatable support, means on said food supporting members operatively engaging said base, means for actuating said main shaft to raise and lower said movable support and associated parts, and for operating said rotatable support and to actuate said food-supporting members.

4. An apparatus of the character described comprising a cooking receptacle, a pair of standards for supporting the same in elevated position, heating means within said receptacle, a transverse support having its ends guided in said standards, a base mounted on said transverse support, a main shaft, means for rotating said shaft, a rotatable support fixed upon said shaft, food supporting members on said rotatable support, frictionally engaging said base, and means for actuating said main shaft to raise and lower said transverse support and associated parts and for operating said rotatable support to actuate said food supporting members.

5. An apparatus of the character described comprising a cooking receptacle open at one end, a pair of standards for supporting the same in elevated position, heating means within said receptacle, a transverse support having its ends guided in said standards, a base mounted upon said transverse support and serving to close the open end of said cooking receptacle, said base having an annular rib adjacent its periphery, a driving shaft, a driven shaft, gearing connecting said driving and driven shaft, a support fixed upon said driven shaft, a series of food supporting members revolubly mounted upon said last-named support, said food supporting members having circular base portions frictionally engaging the annular rib on said base to be rotated thereby, and means for operating said driving shaft to raise and lower said transverse support, and to actuate said driven shaft and the support fixed thereon.

6. An apparatus of the character described comprising a cooking receptacle open at its lower end, a pair of standards for supporting the same in fixed elevated position, heating means within said receptacle, a transverse support having its ends guided in said standards, a base mounted upon said transverse support serving to close the open lower end of said receptacle; said base having an upwardly projected annular rib forming an annular trough between the same and the edge of said base, a driving shaft extending through said transverse support, a driven shaft associated with the upper end of said driving shaft, a train of gear intermediate said driving and driven shaft, a revoluble support fixed upon said driven shaft, a plurality of of studs on said revoluble support, food supports having drip pans and sockets at their lower ends receiving said studs, and means for rotating said driving shaft to raise and lower said transverse support and associated parts, and said driven shaft to operate said revoluble support to cause the drip pans of said food support to be individually rotated by the engagement thereof with the annular rib on said base.

7. An apparatus as claimed in claim 4 in which the operating shaft is formed in a plurality of telescoping screw-threaded sections.

8. An apparatus as claimed in claim 4 in which the operating shaft is extensible and retractible according to the direction of its rotation to raise and lower said transverse support.

9. An apparatus as claimed in claim 4 in which the operating shaft comprises a plurality of telescoping, screw-threaded interengaging sections rendering said shaft extensible and retractible according to the direction of its rotation to raise and lower said transverse support.

10. An apparatus of the character described, a support including a base, a pair of standards thereon, guides in said standards, an annular member secured at the upper ends of said standards, an annular member secured to said standards below said first-named annular member, a double walled cooking receptacle open at its lower end and supported intermediate said annular members, a transverse support working in the guides of said standards, a base mounted on said transverse support for closing the open end of said cooking receptacle, a rotatable support carried by said transverse support, an operating shaft associated with said transverse support and with said rotatable support, driving means for actuating said operating shaft, means for controlling the operating of said shaft actuating means, heating means for said cooking receptacle, means for operating said heating means, and means for controlling the operation of said heating means coordinated with the means for controlling the operation of said shaft actuating means.

11. An apparatus of the character described comprising a base, a pair of standards thereon, guides in said standards, an annular member secured at the upper ends of said standards, a second annular member secured in space relation to and below said first-named annular member, a cooking receptacle including a plurality of glass receptacles open at their lower ends, supported in spaced relation to each other intermediate said annular members and open at their lower ends, a transverse support having ends working in said guides, a base for said cooking receptacle mounted upon said transverse support, an operating shaft connected to said transverse support including two ports, a train of gearing on said transverse support operatively connecting said shaft parts, a rotatable support keyed to one of said shaft parts, spits mounted upon said rotatable support and rotated by the engagement thereof with said rotatable support, an electric motor, gearing between said motor and said operating shaft for actuating said shaft to raise and lower said transverse support and to rotate said rotatable support, circuit closing means for controlling the operation of said motor, a circuit including electric heating elements in said cooking receptacle, a second circuit including said electric motor and circuit controlling means cooperatively associated to control the operation of said electric motor and said heating elements.

12. An apparatus of the character described comprising a base, a pair of standards thereon, guides in said standards, an annular member secured at the upper ends of said standards, a second annular member secured to said standards in spaced relation to and below said first named annular member, a cooking receptacle including a plurality of concentrically spaced glass receptacles open at their lower ends and supported upon said second-named annular member, a transverse support having ends working in the guides in said standards, a base for said cooking receptacle mounted upon said transverse support, an operating shaft connected to said transverse support and including a shaft part mounted in the upper end of said operating shaft, a train of gearing on said transverse support operatively connecting said operating shaft and the shaft part mounted thereon, a circular support keyed to the shaft part mounted on said operating shaft, a plurality of studs on said circular support, spits including drip pans mounted upon said studs, said pans having their flanges frictionally engaging the annular rib of said circular support to rotate the same, an electric motor, a circuit including said motor, gearing between said motor and said operating shaft, a switch for controlling said motor circuit, a second circuit including a plurality of heating elements in said cooking receptacle, and circuit controlling means for said heating elements, the circuit controlling means for said motor and said heating elements being operatively associated whereby when said motor actuates the operating shaft to raise said transverse support and associated parts the heating circuit will be caused to simultaneously energize said heating elements and vice versa.

13. An apparatus of the character described comprising a support, a cooking receptacle at the upper portion thereof, heating means in said receptacle, said receptacle having a movable base, rotatable food supporting means on said base, a motor and a sectional telescopic screw shaft between said movable base and said motor for raising and lowering said base and holding the same in position to close said receptacle and for rotating said food supporting means.

14. An apparatus of the character described comprising a support, a cooking receptacle at the upper portion thereof, heating means in said receptacle, said receptacle having a movable base, rotatable food supporting means on said base, a motor, a sectional telescopic screw-shaft between said movable base and said motor for raising and lowering said base and holding the same in position to close said receptacle and for rotating said food-supporting means and means for limiting the extensible movement of said telescopic shaft parts to cause the same to rotate as a unit and transmit power to said rotatable food supporting means to actuate the same.

LYONEL T. FINIZIE.